(12) United States Patent
Dobson et al.

(10) Patent No.: US 6,596,194 B1
(45) Date of Patent: Jul. 22, 2003

(54) SELF ACTIVATED RARE EARTH OXIDE NANOPARTICLES

(75) Inventors: Peter James Dobson, Oxford (GB); Gareth Wakefield, Oxford (GB)

(73) Assignee: Isis Innovation Limited, Oxford (GB)

(*) Notice: Subject to any disclaimer, the term of this patent is extended or adjusted under 35 U.S.C. 154(b) by 0 days.

(21) Appl. No.: 09/601,918

(22) PCT Filed: Feb. 9, 1999

(86) PCT No.: PCT/GB99/00408

§ 371 (c)(1), (2), (4) Date: Nov. 27, 2000

(87) PCT Pub. No.: WO99/46204

PCT Pub. Date: Sep. 16, 1999

(30) Foreign Application Priority Data

Feb. 9, 1998 (GB) ............................................. 9802760

(51) Int. Cl.⁷ .......................... C09K 11/78; C08K 3/22; C01F 17/00
(52) U.S. Cl. ............................... 252/301.4 R; 423/263
(58) Field of Search .................... 423/263; 252/301.4 R, 252/301.3 L

(56) References Cited

U.S. PATENT DOCUMENTS

| | | | |
|---|---|---|---|
| 3,291,747 A | * 12/1966 | Lefever et al. | 252/301.4 R |
| 4,032,471 A | 6/1977 | Luckey | 252/301.4 R |
| 5,015,452 A | * 5/1991 | Matijevic | 252/301.4 R |
| 5,545,386 A | * 8/1996 | Kaneyoshi et al. | 423/263 |
| 5,637,258 A | 6/1997 | Goldburt et al. | 252/301.4 R |
| 6,251,303 B1 | * 6/2001 | Bawendi et al. | 252/301.4 R |

FOREIGN PATENT DOCUMENTS

| | | |
|---|---|---|
| DE | 42 10 153 A1 | 10/1992 |
| EP | 0 253 552 A2 | 1/1988 |
| EP | 253552 * | 1/1988 |
| EP | 684072 * | 5/1994 |
| EP | 0 684 072 A2 | 11/1995 |
| EP | 0 732 356 A2 | 9/1996 |
| GB | 1 458 700 | 12/1976 |
| JP | 46031844 B4 | 9/1971 |
| NL | 8202824 | 2/1983 |

OTHER PUBLICATIONS

Kobayashi, "Preparation of Ultrafine Precursor Particles for Y2O3 from YC13/Ethylenediaminetetracetic Acid/Urea Solution", Jour. Mat'l. Sci. Lett., vol. 11, No. 11, p. 767–78, 1992.*

Bihari, B., et al., "Spectra and dynamics of monoclinic $Eu_2O_3$ and $Eu^{3+}:Y_2O_3$ nanocrystals," Journal of Luminescence, 75:1–10, (1997).

Goldburt, E.T., et al., "Size dependent efficiency in Tb doped $Y_2O_3$ nanocrystalline phosphor," Journal of Luminescence, 72–74:190–192 (1997).

Kobayashi, M., "Preparation of ultrafine precursor particles for $Y_2O_3$ from $YCl_3$/ethylenediaminetetracetic acid/urea aqueous solution," *J. of Material Science Letters*, 11;767 (1992).

J. Lumin. Abstract: 5(4), 297–307 (1972).

Cho, K.G., et al., "Improved luminescence properties of pulsed laser deposited $Eu:Y_2O_3$ thin films on diamond coated Silicon substrates," American Institute of Physics, Phys. Lett. 71(23), pp. 3335–3337 (1997), Dec.).

* cited by examiner

Primary Examiner—C. Melissa Koslow
(74) Attorney, Agent, or Firm—Wolf, Greenfield & Sacks, P.C.

(57) ABSTRACT

Compounds having the formula $Z_2O_3:Z^{x+}$ where Z is a rare earth metal and x is from 2 to 4, and nanoparticles thereof together with a process for their production and their uses are disclosed.

19 Claims, 3 Drawing Sheets

Absorption spectra of $Tb_2O_3:Tb^{3+}$ nanocrystals

Absorption spectra of $Tb_2O_3:Tb^{3+}$ nanocrystals

Photoluminescence spectrum from $Tb_2O_3:Tb^{3+}$

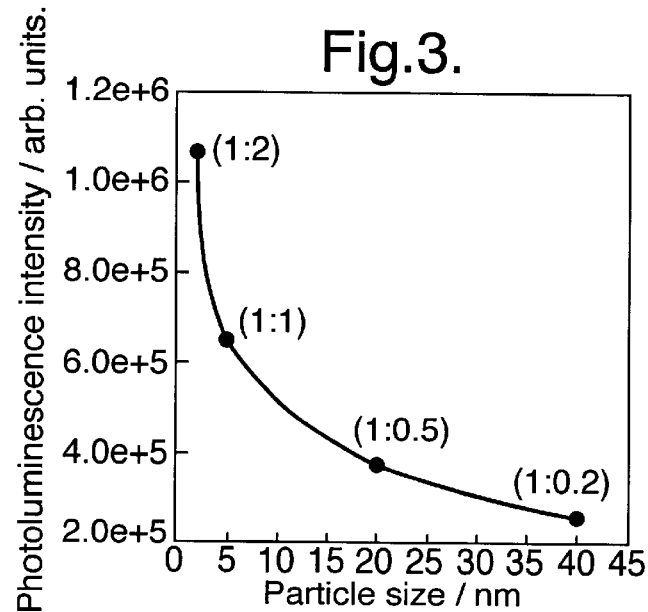
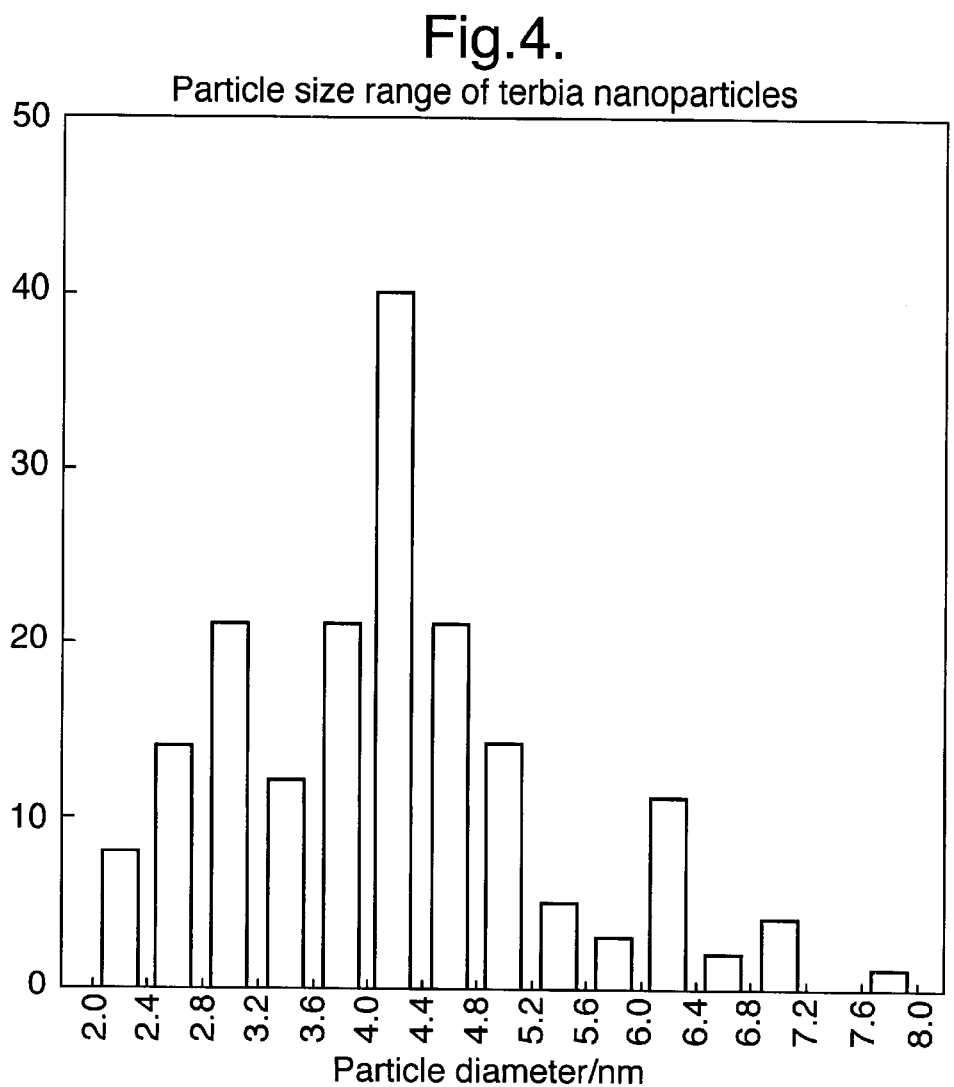

SELF ACTIVATED RARE EARTH OXIDE NANOPARTICLES

BACKGROUND OF THE INVENTION

The present invention relates to rare earth activated phosphors. Such phosphors are known to possess excellent light output and colour rendering properties and have been utilised successfully in many display technologies. One particularly successful material, europium activated yttrium oxide ($Y_2O_3:Eu^{3+}$) has shown particular promise in the field of field emission displays.

There is a need for low voltage phosphors for use in flat panel displays or FED type (field emission) displays. By lowering the voltage one will lower the cost of the driving electronics used to control image generation. For this purpose very small particle sizes, of the order of a few nanometres, are needed. However, a reduction in particle size of a phosphor such as europium activated yttrium oxide results in a decrease in the luminescence efficiency. This is caused by nonradiative recombination via surface defect states. If, though, special steps are taken during the preparation of the particles, these surface states can be passivated thus giving rise to nanoparticle sizes of the phosphor having efficient light emission. However, the special steps which are needed to prepare nanoparticles (i.e. $\leqq 100$ nm) of conventional phosphors such as europium activated yttrium oxide are complex with the result that the cost of producing them is high. In addition it is difficult to be able to produce such particles on a significant scale.

There is, therefore, a need for a way of producing phosphors in the form of nanoparticles which avoids these production difficulties.

SUMMARY OF THE INVENTION

It has now surprisingly been found according to the present invention that nanoparticles can readily be obtained of a new family of rare earth oxides, these being such that the activating ion is of the same element as that of the oxide. Accordingly, the present invention provides a compound of the formula $Z_2O_3:Z^{x+}$ where Z represents a rare earth element and x is 2 to 4, generally 3.

Preferred rare earth elements/metals include terbium, europium and cerium.

Preferably the phosphors are in the form of nanoparticles, especially ones having a particle size from 2 to 10 nm, especially not exceeding 5 nm, for example about 4 nm.

BRIEF DESCRIPTION OF THE DRAWINGS

FIG. 3 is a graph of the photoluminescent activity against particle size for particles of $Eu_2O_3$.

FIG. 4 is a bar graph of the size distribution of terbia nanoparicles.

DETAILED DESCRIPTION OF THE INVENTION

Figure 1:
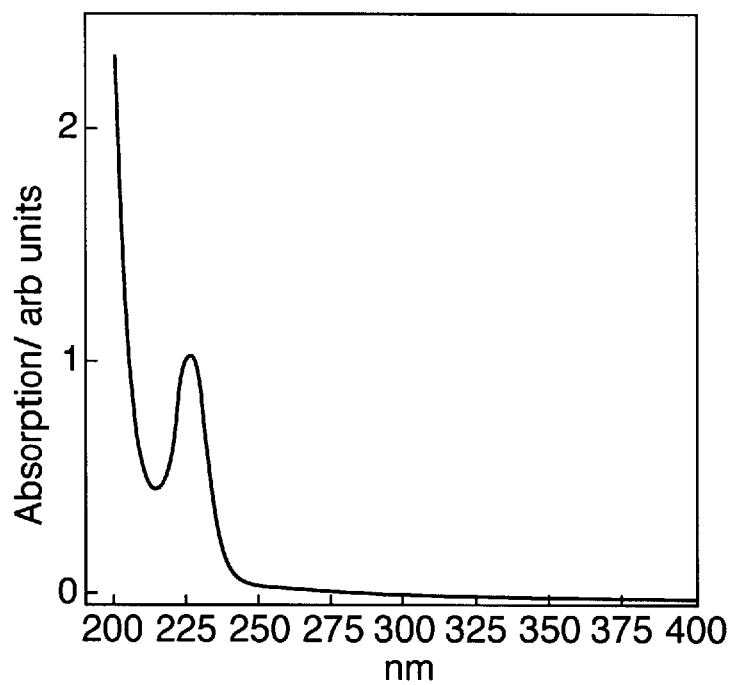
FIG. 1 is an absorption spectrum of $Tb_2O_3:Tb^{3+}$ nanocrystals.

The phosphors of the present invention can readily be produced by a simple precipitation method. In this method alkali is added to a solution of a rare earth metal salt, typically a chloride, in the presence of a metal complexing surface active molecule which has a surface capping effect.

As indicated, the preferred salts are chlorides and it is believed that the presence of chlorine enhances the display technology but it is also possible to produce luminescent nanoparticles in the complete absence of chlorine from any soluble salt, for example from nitrates.

The surface active molecule binds to the rare earth ions and acts to passivate any surface state which may allow for nonradiative recombination; it thus has a surface capping effect. This binding action is also beneficial to the optical properties as it reduces the likelihood of recombination via surface dangling bond states. Suitable surface active molecules which may be used include trioctyl phosphine oxide (TOPO), which is preferred, sodium hexametaphosphate, crown ethers and amines. It is generally better to use a purely organic molecule not containing any metal.

The nature of the alkali used is not particularly critical provided it dissolves in the solvent employed. Typical alkalis include ammonium hydroxide and sodium hydroxide.

Typically the process is carried out by mixing the salt and surface active molecule in a mutual solvent, for example for about 15 minutes, and then adding the alkali in a solvent thereto to cause colloidal precipitation over a period of a few minutes.

It is not essential for the two solvents to be the same although they should be miscible with one another so as to form a single phase. In general it is desirable to use solvents (which must, of course, be capable of dissolving the salt) which are slightly reducing or dehydrating such as thiols and alcohols, including glycols such as ethylene glycol, as well as aliphatic alcohols such as ethanol, propanol and methanol which is strongly preferred.

It is preferred that the process is carried out with little or no water since this has a tendency to promote the formation of hydroxide. The pH should generally be from 5 to 9 (measured in methanol; 5.7 is equivalent to about 8 in water).

The reaction is conveniently carried out at room temperature. By increasing the temperature there is a tendency to increase particle size or vice versa. Thus a typical temperature range is from 20° to 40° C.

The relative molar amounts of the rare earth salt and surface active molecule generally range from a minimum of 0.3 up to 2.0 although a significant excess is generally unnecessary. Preferably the molar ratio of surface active molecule to rare earth salt is from about 1:1 to 2:1. Particle size in the sub 50 nm range may be varied by varying this ratio; the preferred ratio can provide particles in the sub 5 nm range. FIG. 3 of the accompanying drawings shows how the luminescence efficiency varies with oarticle size for $Eu_2O_3$ nanoparticles, the figures in parenthesis being the ratio of rare earth salt to surface active molecule, (TOPO).

Typically the concentration of rare earth metal salt in the solution will be from 0.0001 to 0.5 moles, for example from 0.0005 to 0.1 moles. There is a tendency for flocculation to occur at higher concentrations.

The resulting precipitate and solvent can be concentrated by evaporation and the particles separated and dried. If desired or necessary, specific particle sizes can be selected using various methods known in the art.

It has been found that by means of this process it is possible to obtain particles which have good size uniformity and which have good crystal structure. This is not the case when attempts are made to reduce larger particles produced by previous procedures, involving calcining, grinding/ball milling and the like.

Figure 2:
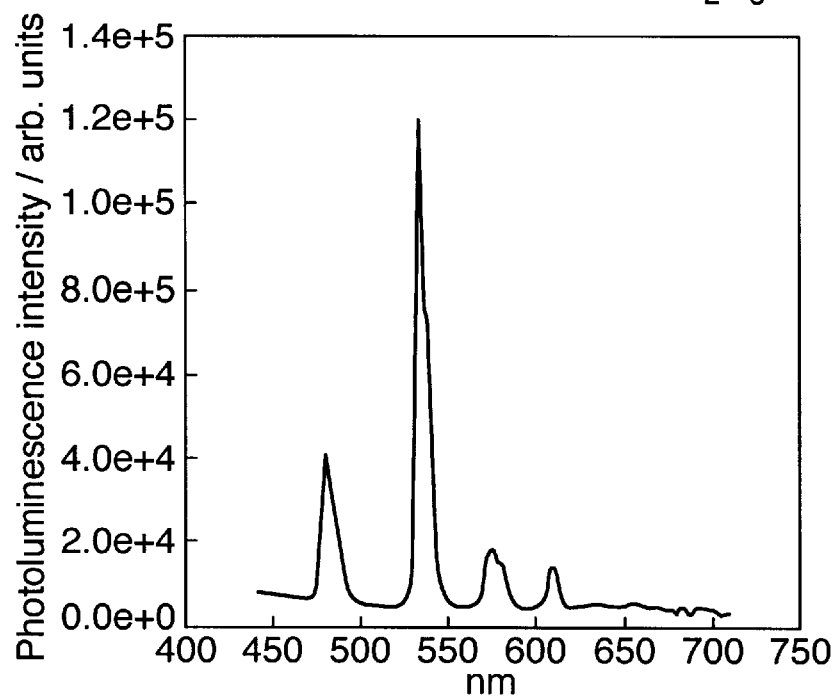
FIG. 2 is a photoluminescence spectrum of $Tb_2O_3:Tb^{3+}$.

Preferred compounds of the present invention include $Tb_2O_3$:$Tb^{3+}$, $Ce_2O_3$:$Ce^{3+}$ and $Eu_2O_3$:$Eu^{3+}$. The properties of the various rare earth oxides obtained are similar. Typically, they possess a strong peak in the absorption spectrum giving rise to emissions which are mostly in the visible region although some are in the ultra violet region. For example for $Tb_2O_3$:$Tb^{3+}$ (obtained with an average particle size of 4 nm) the peak is at 230 nm as shown in accompanying FIG. 1. The photo-luminescence spectrum of this material is to be found in accompanying FIG. 2; it will be seen that it provides peaks at 500 and 540 nm resulting in green light emission. Typical quantum efficiencies for the particles obtained are in the range 10 to 40%. The corresponding cerium and europium particles emit in the blue/UV and red regions, respectively. It will be appreciated that a range of colours throughout the spectrum can be achieved by using the appropriate rare earth precursor material, as one skilled in the art will know. Thus a corresponding compound of dysprosium (Dy) provides a white emission, of samarium (Sm) an orange emission, of holmium (Ho) a blue emission, and of erbium (Er) or of neodymium (Nd) an emission in the near infra-red. A corresponding $Eu^{2+}$ compound can also be prepared.

The nanoparticles of the present invention are suitable for use in FED type displays. For this purpose the particles can be embedded in a suitable plastics material by a variety of methods including dip coating, spin coating and meniscus coating or by using an air gun spray. Accordingly, the present invention also provides a plastics material which incorporates nanoparticles of the present invention.

Suitable polymers which can be employed include polyacrylic acid, polystyrene and polymethyl methacrylate. Such plastics materials can be used for photoluminescence applications and also in electroluminescence applications where an AC current is to be employed. If a DC current is employed then conducting polymers such as polyvinylcarbazole, polyphenylenevinylidene and polymethylphenylsilane can be employed. Poly 2-(4-biphenylyl)-5-(4-tertiarybutyl phenyl)-1,3,4-oxidiazole (butyl-PBD) can also be used. Desirably, the polymer should be compatible with the solvent, typically methanol, used to apply the particles to the plastics material.

Typically, the particles will be applied to a thin layer of the plastics material, typically a plastics material having a thickness from 0.5 to 15 microns so that they become embedded in it.

The maximum concentration of particles is generally about 35% by weight with 65% by weight of polymer. There is a tendency for the polymer to crack if the concentration exceeds this value. A typical minimum concentration is about 2% by weight (98% by weight polymer). If the concentration is reduced below this value then "holes" tend to form in the plastics material.

The following procedure illustrates a typical synthesis of the present invention.

5 ml of $5\times10^{-3}$M $TbCl_3.6H_2O$ in HPLC grade methanol was mixed for 10 minutes with 5 ml of $5\times10^{-3}$M TOPO in methanol. To this was added 1.3 ml of $5\times10^{-2}$M NaOH/in methanol dropwise in order to precipitate the nanoparticles. The solution was mixed for a further 10 minutes.

FIG. 4 gives the particle size distribution for a representative sample of 180 terbia nanoparticles; a drop of the particles in solution was placed on a lacey carbon film and the methanol evaporated. The size of the particles was determined using a high resolution transmission electron microscope.

Figure 5:
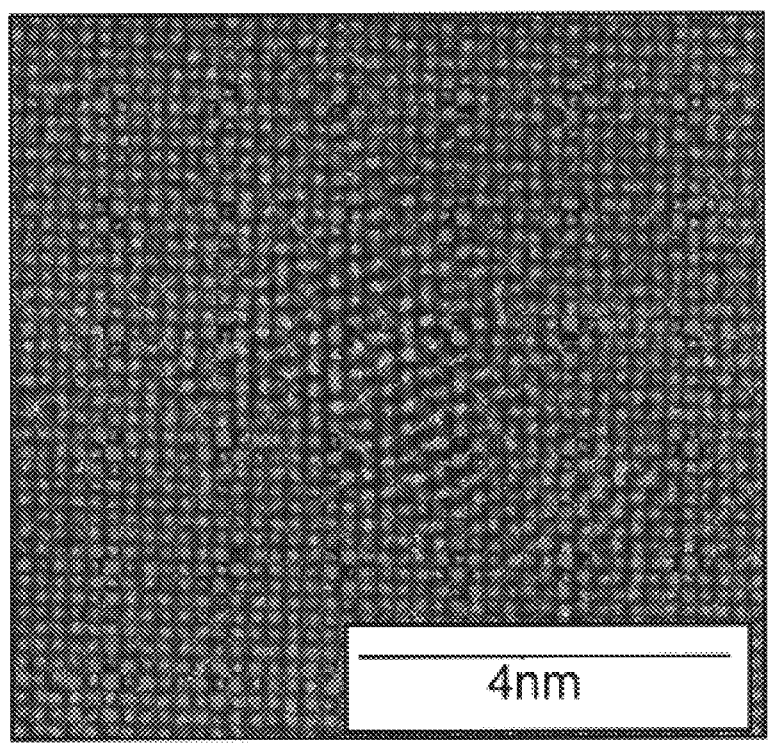
FIG. 5 is a transmission electron microscope photograph of europia nanopartcles.

FIG. 5 is a transmission electron microscope photograph of europia nanoparticles obtained in a similar manner.

What is claimed is:

1. A compound having the formula $Z_2O_3$: $Z^{x+}$ where Z is a rare earth metal and x is 3 in the form of phosphor particles of size no greater than 10 nm.

2. The compound of claim 1, wherein the phosphor particles have a quantum efficiency of 10% to 40%.

3. A compound according to claim 1 in which Z is europium, terbium or cerium.

4. A compound according to claim 1 in the form of particles of size from 2 to 10 nm.

5. A compound according to claim 4 in the form of particles of size about 4 nm.

6. A process for preparing a compound as claimed in claim 1 which comprises adding alkali to a solution of a rare earth metal salt so as to cause the rare earth oxide to precipitate in the presence of a metal complexing surface active molecule which has a surface capping effect.

7. A process according to claim 6 in which a solution of the salt and surface active molecule is prepared and a solution of the alkali is added thereto.

8. A process according to claims 6 or 7 in which the solvent is a dehydrating solvent.

9. A process according to claim 8 in which the solvent is an aliphatic alcohol.

10. A process according to claims 6 or 7 in which the molar concentration of the surface active molecule relative to that of the rare earth metal salt is at least 0.3.

11. A process according to claim 10 in which the molar concentration of the surface active molecule relative to that of the rare earth metal salt is from 1:1 to 2:1.

12. A process according to claims 6 or 7 in which the rare earth metal salt is a chloride.

13. The process according to claim 6 wherein the surface active molecule is selected from trioctyl phosphine oxide, sodium hexametaphosphate, crown ethers and amines.

14. A process for preparing a rare earth metal oxide phosphor having the formula $Z_2O_3$:$Z^{x+}$ where Z is a rare earth metal and x is 3, in the form of phosphor particles having a quantum efficiency of 10% to 40%, which comprises adding alkali to a solution of a salt of the rare earth metal in the presence of a metal complexing surface active molecule which has a surface capping effect so as to cause the rare earth oxide to precipitate.

15. A plastics material which comprises particles as claimed in claim 1.

16. A material according to claim 15 which is 0.5 to 15 microns thick.

17. A material according to claims 15 or 16 which contains 2 to 35% by weight of the particles, based on the weight of the material.

18. A material according to claim 15 which is made of an electrically conducting polymer.

19. A material according to claim 15 which is made of polyacrylic acid, polymethyl methacrylate or polystyrene.

* * * * *